United States Patent
Luzzi et al.

(10) Patent No.: US 9,728,307 B2
(45) Date of Patent: Aug. 8, 2017

(54) R-STACK ARRESTER

(71) Applicants: Glenn J. Luzzi, Mt. Bethel, PA (US); Jeffrey J. Madden, Bernardsville, NJ (US)

(72) Inventors: Glenn J. Luzzi, Mt. Bethel, PA (US); Jeffrey J. Madden, Bernardsville, NJ (US)

(73) Assignee: Richards Manufacturing Company Sales, Inc., Irvington, NJ (US)

(*) Notice: Subject to any disclaimer, the term of this patent is extended or adjusted under 35 U.S.C. 154(b) by 0 days.

(21) Appl. No.: 13/844,033

(22) Filed: Mar. 15, 2013

(65) Prior Publication Data

US 2014/0268471 A1    Sep. 18, 2014

(51) Int. Cl.
  *H02H 1/00* (2006.01)
  *H01C 7/12* (2006.01)

(52) U.S. Cl.
  CPC ..................... *H01C 7/12* (2013.01)

(58) Field of Classification Search
  USPC .......................................... 361/127
  See application file for complete search history.

(56) References Cited

U.S. PATENT DOCUMENTS

| 5,114,357 | A  | * | 5/1992  | Luzzi ..................... H01R 13/53 |
|           |    |   |         |                              439/183 |
| 7,381,103 | B2 | * | 6/2008  | Luzzi ............................ 439/801 |
| 7,503,785 | B2 | * | 3/2009  | Stepniak ....................... 439/187 |
| 7,958,631 | B2 | * | 6/2011  | Hughes et al. .................. 29/857 |
| 2011/0287652 | A1 | * | 11/2011 | Roscizewski et al. ....... 439/345 |
| 2014/0268471 | A1 | * | 9/2014  | Luzzi ...................... H01C 7/12 |
|           |    |   |         |                              361/127 |

* cited by examiner

*Primary Examiner* — Ronald W Leja
(74) *Attorney, Agent, or Firm* — Bakos & Kritzer (57) ABSTRACT

An elbow arrester with a T-body is disclosed capable of coupling with an apparatus for protection from transient over voltage, and coupling with additional cable accessories, without having to loosen the initial connection with the coupled apparatus. The elbow body of the T-body arrester has a first portion, and a second portion protruding from an intermediate section of the first portion to define a T-body. A receiving feature is located within the first portion extending towards a first end, while a male feature is coupled to a second end of the first portion, opposite from the receiving feature. A coupling fastener is integrally molded into the first portion, providing for an apparatus coupled to the coupling fastener to be decoupled without loosening the connection of another apparatus connected to the T-Body elbow. Further, decoupling the other apparatus does not loosen the apparatus coupled to the coupling fastener.

10 Claims, 8 Drawing Sheets

R-STACK ARRESTER

FIELD OF INVENTION

The present invention generally relates to the field of surge arrester and, more particularly, to a T-body arrester used for underground and overhead electrical systems.

BACKGROUND OF INVENTION

Conventional surge arresters protect electrical systems from transient over-voltage surges from lightning, switching, and the like. Traditionally, a 200 Ampere (200 A) elbow arrester configuration is used to address the surges. In this configuration, the bushing of the desired apparatus designed to protect against the surges is connected to a first portion of the elbow connection. An arrester, typically consisting of metal oxide varistor (MOV) elements, is positioned in the second portion of the elbow connector. The MOV elements and bushing are electrically connected in an intermediate portion of the first part of the elbow connection. A ground connecter—which is positioned at an end of the second portion of the elbow connector—is electrically connected to the MOV on a first end and coupled to an external ground on a second end. Therefore, a voltage is applied across the MOV elements from the bushing connection of the apparatus and ground. At steady state, the MOV elements have a relatively high impedance, however as the voltage applied across the elements increases, such as from a lightning surge, the impedance of the MOV elements decreases until a breakdown voltage, wherein the impedance rapidly decreases towards zero. As a result, the MOV elements become highly conductive and serve to conduct transient current from the surge voltage to ground, thereby protecting the apparatus.

In applications of higher loads than 200 A, the resulting 600 A connector system requires an adapter known as a load break reducing tap plug (LRTP), which, in conjunction with an extender is coupled to the first portion of the 200 A elbow arrester. The inherent disadvantages of using such a system is that the additional parts introduce installation complexities and fault points for the system.

Such inherent disadvantages in known systems has not been entirely ignored in the industry. In response a T-Body surge arrester with an integrated 600 ampere (600 A) bushing was developed, thereby removing the need for the 600 A/200 A LRTP, and extender. An example of a T-body surge arrester configuration can be found in issued patent Yaworski et al. U.S. Pat. No. 8,018,707 entitled "High Amperage Surge Arrestors." As discussed in the Yaworski et al. disclosure, a T-body elbow arrester comprises an elbow body having a first portion and a second portion extending from an intermediate section of the first portion in a generally perpendicular direction to define the T-shape. A surge arrester is position in the second portion and an end cap assembly—positioned at an end of the second portion—is electrically connected to the surge arrester. A bushing receiving portion region is positioned on a first end of the first portion of the elbow body, while an insulating plug extends from the intermediate portion of the first portion to a second end of the first portion of the elbow body. An end of the insulating plug is located in the intermediate portion of the elbow body to be coupled to secure the T-body elbow arrester in the assembly.

A disadvantage of the configuration disclosed in Yaworski et al. is that the initial connection of an arrester connected to the bushing receiving area must be removed in order to connect a power cable via a T-body elbow to the same connection point. Another method of installing a power cable via a 600 A elbow to the arrester of Yaworski would be to remove the insulating plug (thereby loosening the connection to the bushing), install another accessory device known as a connecting plug, and then install the new 600 A elbow and power cable.

Therefore, there is a need in the art for an arrester configuration, with a receiving feature that can be mounted directly to an apparatus, such as a bushing or connector accessory. It is preferred that such an apparatus further include a built in male feature designed to allow connection to another accessory.

In addition, there is a need for a coupling fastener positioned in the arrester that allows an apparatus coupled to the coupling fastener to be decoupled without loosening the connection of another apparatus coupled to the elbow body.

Furthermore, there is a need for an insulating cap that couples with the male feature. When the insulating cap is removed the male feature can then be coupled to another accessory, without loosening the connection of an apparatus coupled to the receiving feature.

SUMMARY

According to various embodiments the present invention, an elbow arrester with a T-body is disclosed capable of coupling with an apparatus for protection from transient over voltage, and coupling with additional cable accessories, without having to loosen the initial connection with the coupled apparatus. The elbow body of the T-body arrester has a first longitudinally extending portion and a second longitudinally extending portion. The second portion protrudes in a substantially perpendicular direction from an intermediate section of the first portion to define a T-body. A surge arrester portion is located within the second portion of the elbow body. Further, an end cap assembly is coupled to an end of the second portion, and is electrically connected to the surge arrester. A receiving feature is located within the first portion of the elbow body extending from the intermediate section towards a first end of the first portion of the elbow body. Further, a male feature is coupled to a second end of the first portion of the elbow body, opposite from the receiving feature.

In one embodiment, a coupling fastener is integrally molded into the intermediate portion of the elbow body extending towards the male feature. In yet another embodiment, the coupling fastener is integrally molded onto an end of the male feature. As a result, an apparatus coupled to the coupling fastener can be decoupled without loosening the connection of another apparatus connected to the T-Body elbow.

In one embodiment, the receiving feature is configured to conformably receive a 600 A standard shaped male bushing, and the surge arrester is a metal oxide varistor (MOV) arrester block stack. The end cap assembly can include an end cap in the second portion and a ground connector. The ground connector has a first end that is electrically connected to a first end of the surge arrester, and a second end that is configured to be connected to an external ground.

In another embodiment, a second, opposite end of the surge arrester is positioned in the intermediate portion of the first portion of the elbow body. The surge arrester is electrically connected to an apparatus that is coupled to the receiving portion of the elbow body. Further, a second apparatus coupled to the male feature of the elbow body is electrically connected to the surge arrester when an apparatus is coupled to the receiving portion of the elbow body. The electrical connection defines an electric path from the apparatus to the ground connector through the surge arrester.

In an embodiment where the coupling fastener is positioned in the intermediate section of the first portion of the elbow body, the electrical connection is created when the apparatus is coupled to the coupling fastener through the receiving portion. The apparatus can include a screw threaded section. The screw threaded section can be a male thread and a second end of the coupling fastener can include a female thread section configured to threadably receive the male thread of the apparatus. A first end of the coupling fastener is connected to a conductive core extending towards the male feature. When an apparatus is coupled to the male feature and another apparatus—such as an insulating plug—is coupled to the receiving portion, the conductive core electrically connects both apparatuses to the arrester.

In another embodiment the coupling fastener is located on an end of the male feature. Coupling an apparatus to the coupling fastener defines an electrical connection, when another apparatus is coupled to the receiving portion of the elbow body.

In further embodiments, an insulating cap can be attached to an end of the male feature. The insulating cap comprises of a receiving portion, pulling eye, and grounding eye. The receiving portion is configured to couple with the male feature of the T-body elbow arrester, while the pulling eye is positioned substantially in line with the longitudinal-axis of the insulating cap. When the insulating cap is coupled to the male feature the pulling eye provides a location to connect a hotstick or other device for engaging or disengaging the insulating cap. Further, the grounding eye can be used to ground the semi-conductive outer surface of the insulating cap.

In further embodiments, the elbow body is an elastomer, such as EPDM rubber.

BRIEF DESCRIPTION OF THE DRAWINGS

A further understanding of the present invention and the objectives other than those set forth above can be obtained by reference to the various implementations set forth in the illustrations of the accompanying figures. Although the implementations illustrate certain aspects of the present invention, including the apparatus and method of use of the invention, in general, together with further objectives and advantages thereof, may be more easily understood by reference to the drawings, examples, and the following description. One skilled in the art will recognize that the examples and figures are not intended to limit the scope of this invention, which is set forth with particularity in the claims as appended or as subsequently amended, but merely to clarify and exemplify the invention. The detailed description makes reference to the accompanying figures wherein:

DETAILED DESCRIPTION OF THE EMBODIMENTS

Figure 1:
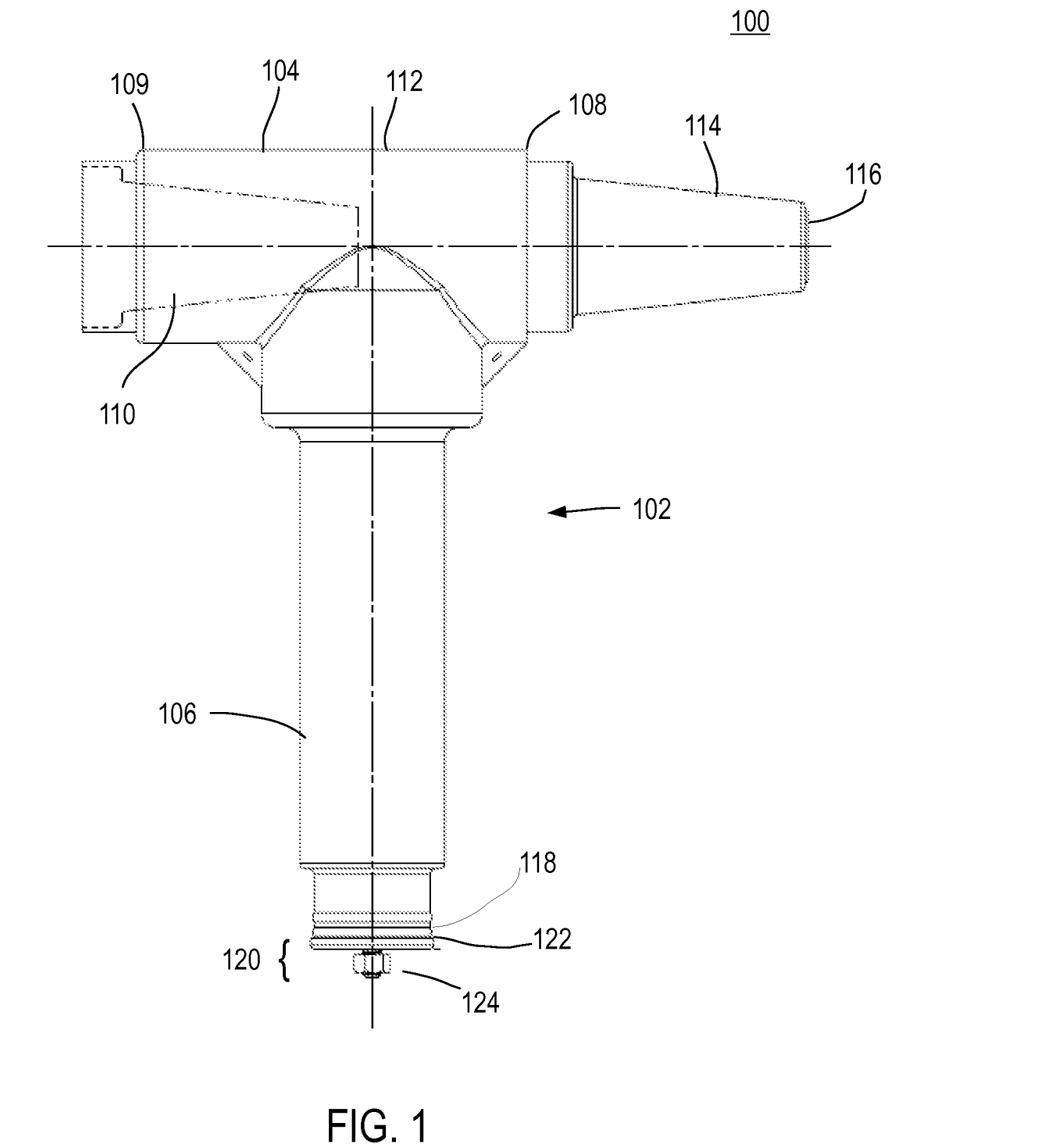
FIG. 1 is a side view of a 600 A (Ampere) T-body elbow arrester according to an embodiment of the present invention.

FIG. 1 is a side view of a 600 A (Ampere) T-body embodiment of the present invention, which includes an elbow body 102. The elbow body 102 has a first longitudinally extending portion 104 and a second longitudinally extending portion 106 extending substantially perpendicular from an intermediate section 112 of the first portion 104, to form the T-body. In one embodiment first portion 104 and second portion 106 are integrally formed to create elbow body 102. In an additional embodiment, first portion 104 and second portion 106 are separable and connected at intermediate section 112 of first portion 104.

The elbow body 102 can be an electrically shielded elbow body, wherein the outer surface is an elastomer, such as EPDM rubber or the like.

Figure 7:
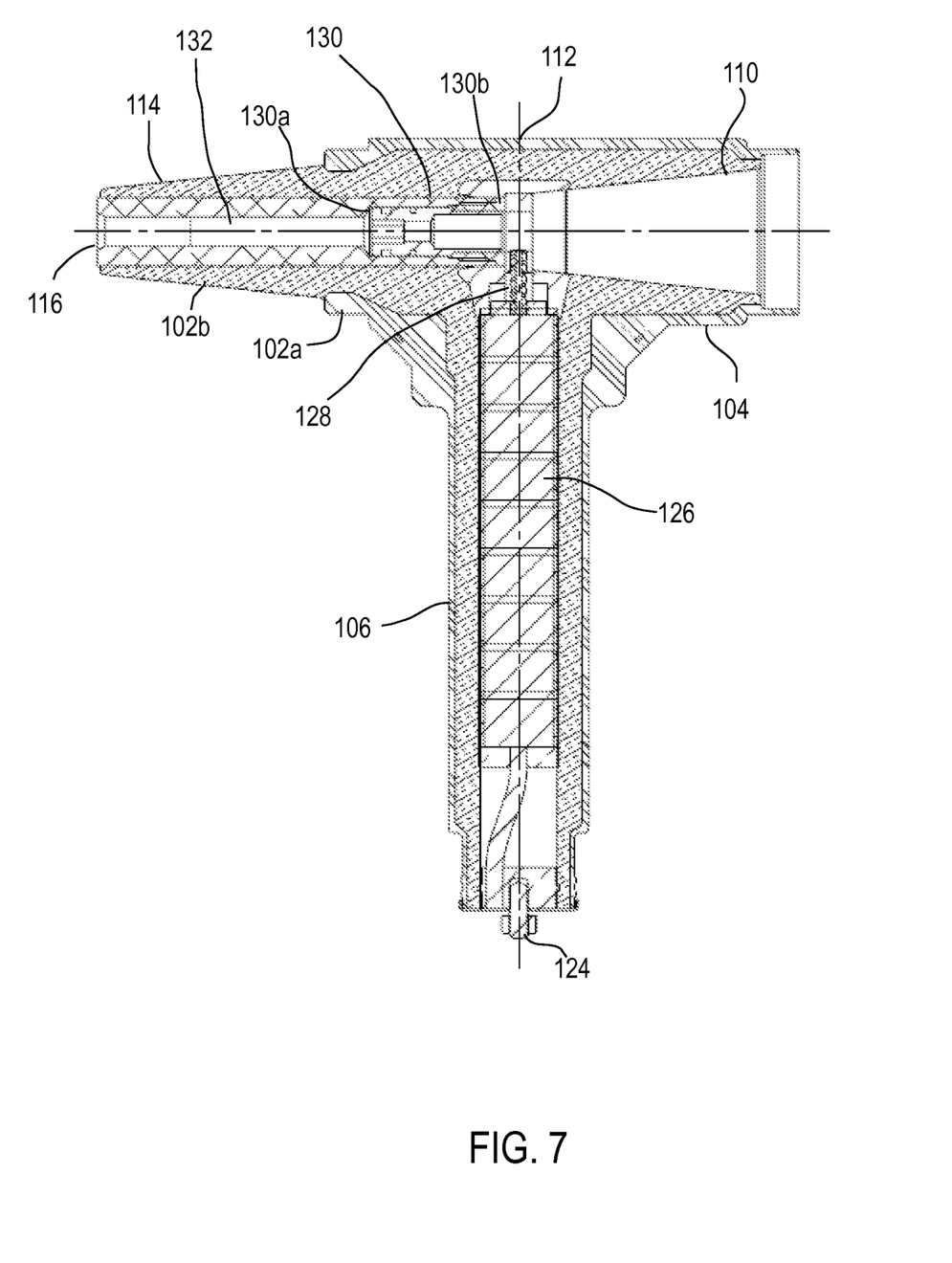
FIG. 7 is a cross-sectional side view of an embodiment of the present invention for the configuration in FIG. 4 and FIG. 5.
Figure 8:
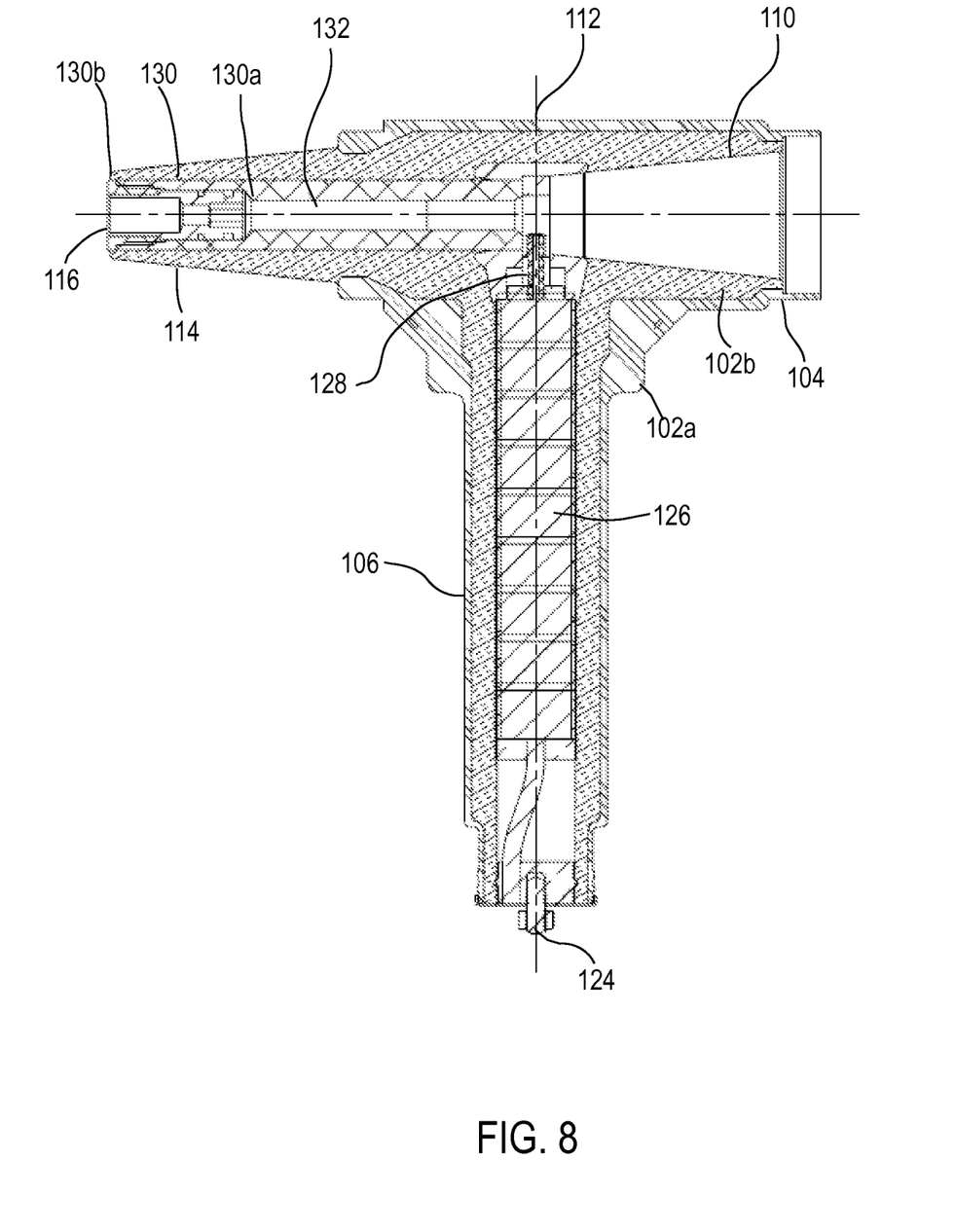
FIG. 8 is a cross-sectional side view of an embodiment of the present invention for the configuration in FIG. 6.

A surge arrester, shown in FIG. 7 and FIG. 8 as a metal oxide varistor (MOV) arrester block stack 126, is located in the second portion 106 of elbow body 102.

An end cap assembly 120 is attached to an end 118 of second portion 106. The end cap assembly 120 includes, but is not limited to, an end cap 122, and ground connector 124. The ground connector 124 is electrically connected to surge arrester 126 (shown in FIG. 7 and FIG. 8) located in the second portion 106 of elbow body 102. The ground connector 124 is configured to be connected to an external ground, and its composition can consist of various materials such as brass, stainless steel, and the like.

Further, a coupling fastener 130 is located in intermediate section 112 of first portion 104, as shown in FIG. 7, or end 116 of male feature 114, as shown in FIG. 8.

A receiving feature 110 is located in the first portion 104 of elbow body 102 extending from intermediate section 112 towards a first end 109 of first portion 104. Receiving feature 110 can be configured to comfortably receive a bushing, such as a 600 A standard bushing, or other connector accessories. A male feature 114 is coupled to a second end 108 of the first portion 104 of elbow body 102.

Male feature 114 and first portion 104 of elbow body 102 can be molded using techniques known to one skilled in the art. For example, a single molding can be made whereby male feature 114 and first portion 104 of elbow body 102 are injected into their respective sections. The sections can also be molded separately using known molding techniques and the male feature 114 mold can be affixed to the first portion 104 mold of elbow body 102. In another example, the first portion 104 of elbow body 102 can be placed in a second mold, so that male feature 114 is overmolded onto first portion 104 of elbow body 102, thereby bonding male feature 114 to first portion 104 of elbow body 102. Coupling fastener 130 (shown in FIG. 7 and FIG. 8) is integrally molded into the mold of elbow 102, using molding procedures commonly performed in the art.

In one embodiment the male feature 114 is a 600 A deadbreak tap, that can be coupled to an apparatus.

An end 116 is located on an end of male feature 114. An insulating cap 200 (shown in FIG. 2) can be attached to male feature end 116 when male feature 114 is not coupled to another apparatus or accessory.

Figure 2:
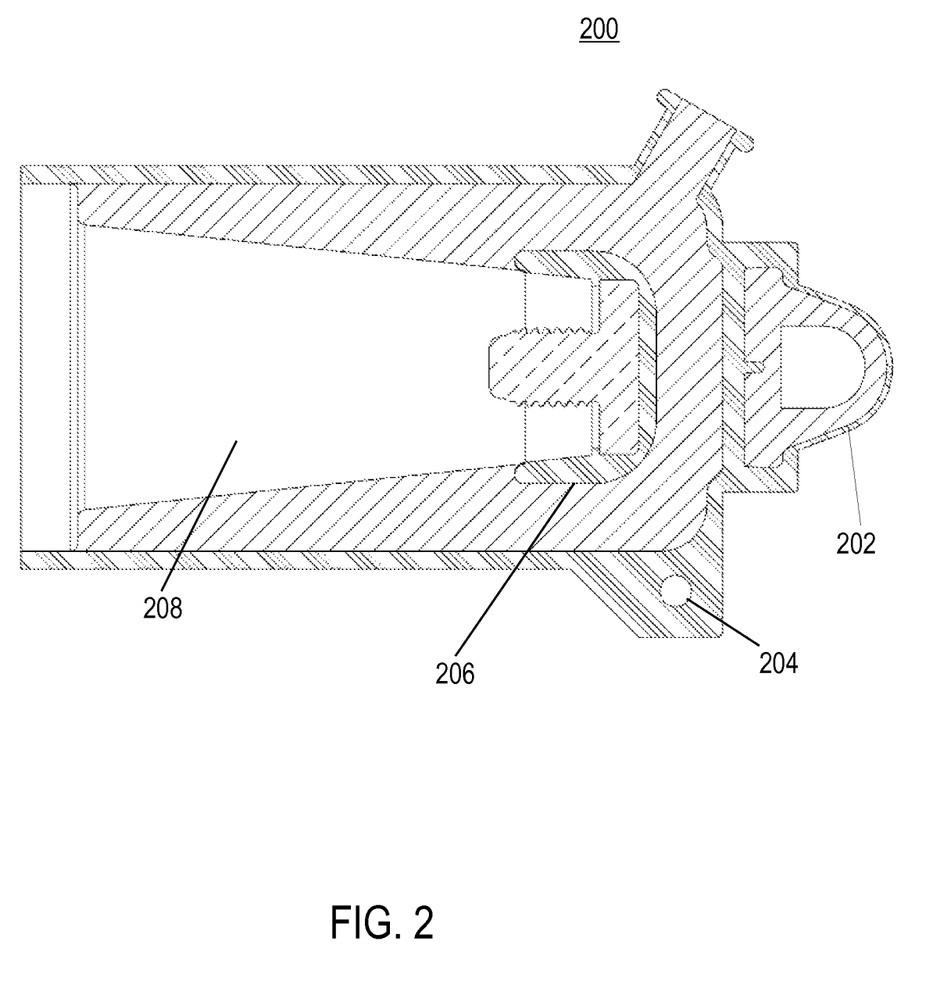
FIG. 2 is a cross-sectional side view of an insulating cap according to an embodiment of the present invention.

FIG. 2 is a cross-sectional side view of an insulating cap 200 according to some embodiments of the present invention. Insulating cap 200 comprises of a pulling eye 202, grounding eye 204, coupling component 206, and receiving portion 208. In the present embodiment, receiving feature 208 is configured to couple with male feature 114 (as shown in FIG. 1) of T-body elbow arrester 100, while pulling eye 202 is positioned substantially in line with the longitudinal-axis of insulating cap 200. When insulating cap 200 is coupled to male feature 114, pulling eye 202 provides a location to connect a hotstick or other device for engaging or disengaging insulating cap 200. Further, grounding eye 204 can be used to ground the semi-conductive outer surface of insulating cap 200. In the present embodiment, coupling component 206 consists of a male threaded section that is configured to threadably insert into male feature 114. One skilled in the art would understand that coupling component 206 can utilize other configurations such as a female threaded section.

Figure 3:
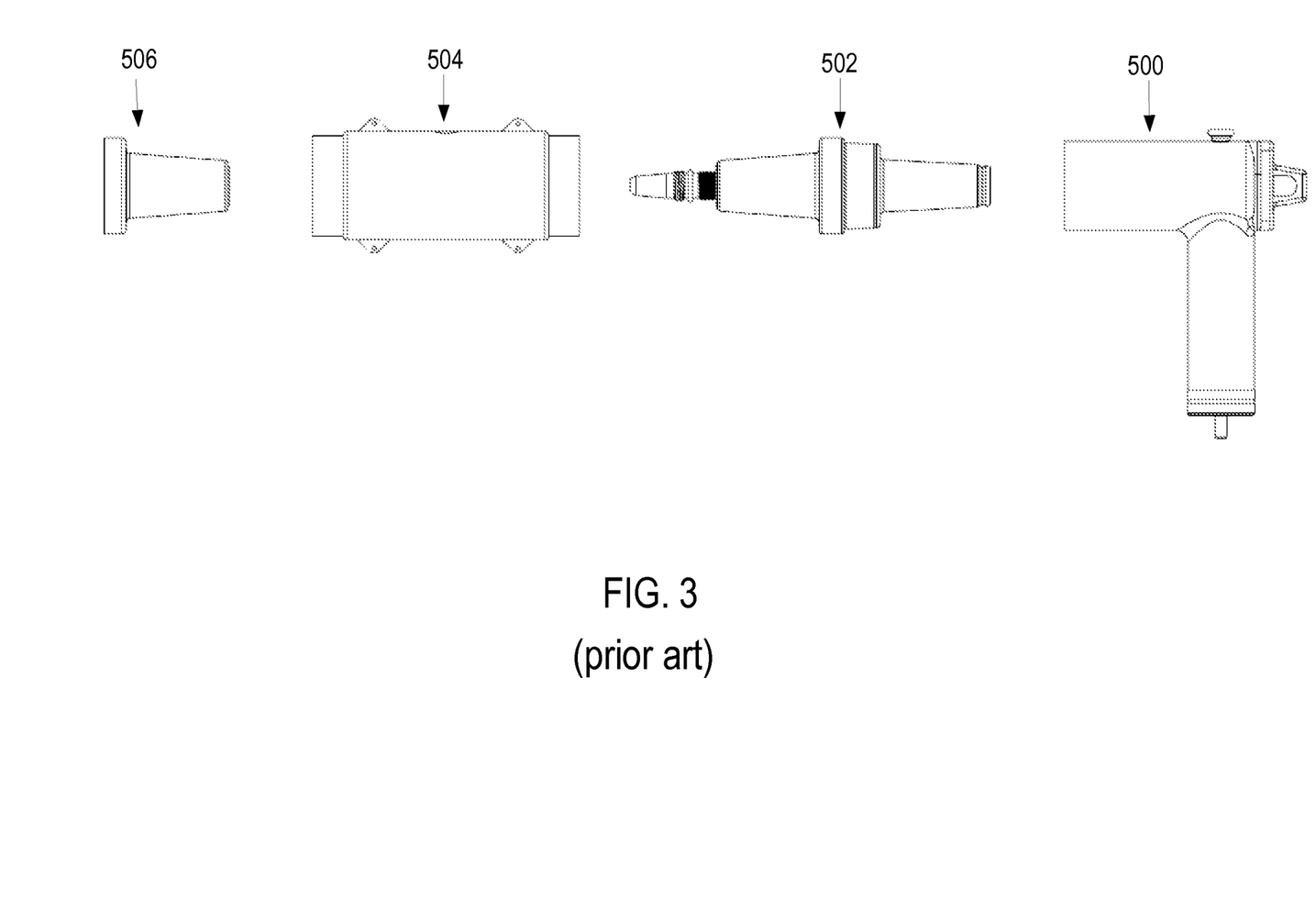
FIG. 3 is a side view illustrating the coupling of a 200 A (Ampere) elbow to a load break reducing tap plug.

FIG. 3 is a side view illustrating the coupling of a 200 Ampere (A) elbow to a load break reducing tap plug. In the configuration, elbow 500 is rated for 200 A loads. In applications of higher loads than 200 A, a load break reducing tap plug (LRTP) 502 is coupled to elbow 500. Further LRTP 502 is coupled to an extender 504. Finally, the assembly consisting of elbow 500, LRTP 502, and extender 504, is coupled to the bushing 506 of the apparatus to protect the connection. The inherent disadvantage of using such a system is that the additional parts introduce installation complexities and fault points for the system.

Figure 4A:
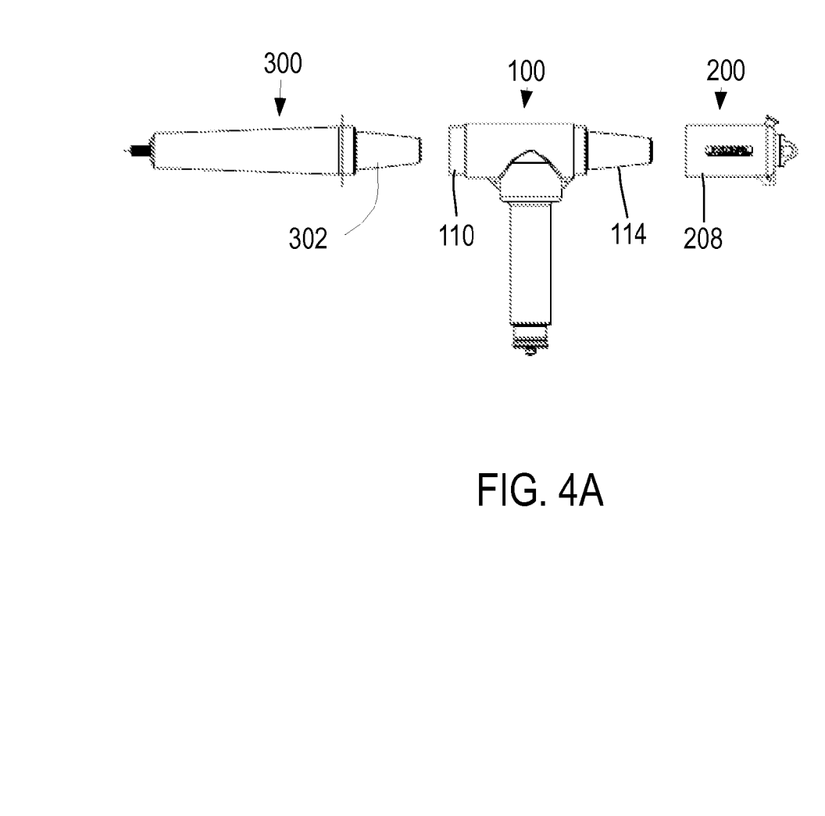
FIG. 4A and FIG. 4B are side views that depict coupling an embodiment of the present invention to a bushing at the receiving feature, and to an insulating cap at the male feature.
Figure 4B:
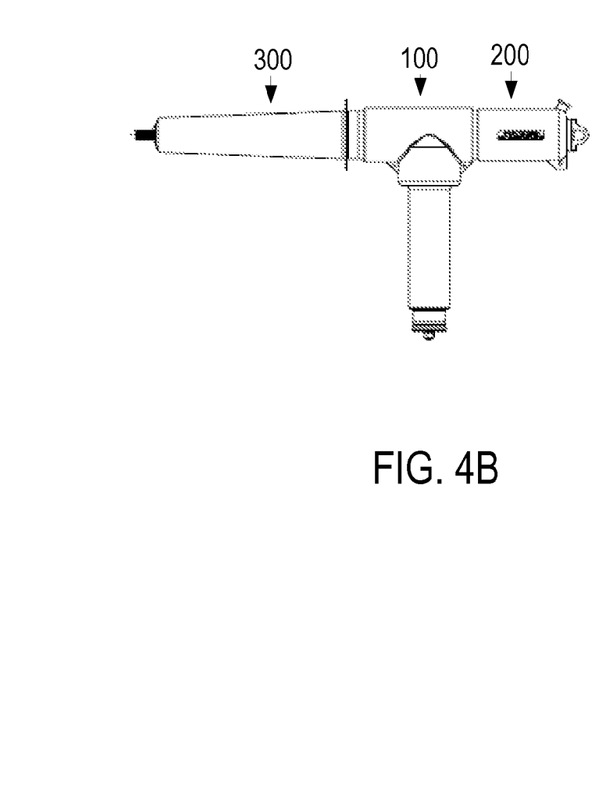

FIG. 4A and FIG. 4B are side views that depict a configuration, wherein T-body elbow arrester 100 of FIG. 1 is coupled to a bushing 300 and insulating cap 200. Bushing 300 includes an integrally molded male feature 302. In the present embodiment, receiving feature 110 of elbow arrester 100 is configured to slidably receive male feature 302. Receiving feature 208 of insulating cap 200 is configured to couple with male feature 114 of T-body elbow arrester 100.

Figure 5A:
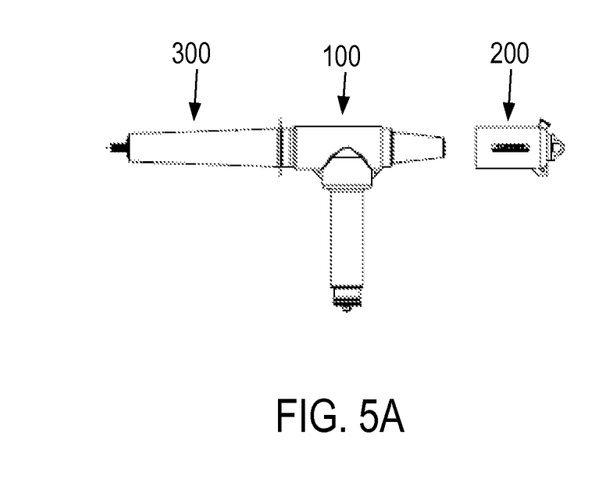
FIG. 5A, FIG. 5B, and FIG. 5C are side views that depict coupling an embodiment of the present invention to a bushing at the receiving feature and to a cable accessory at the male feature.
Figure 5B:
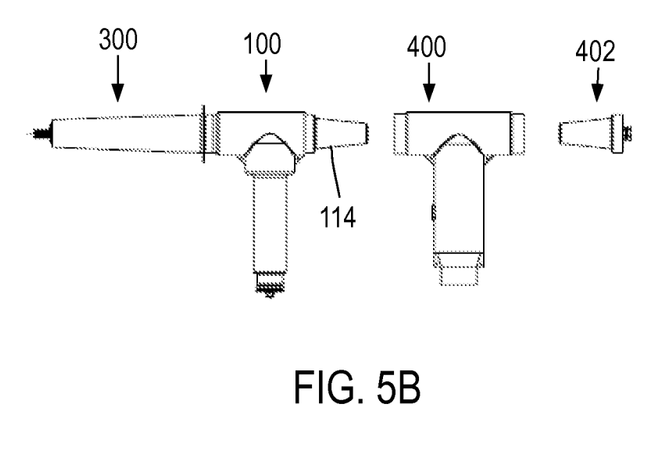
Figure 5C:
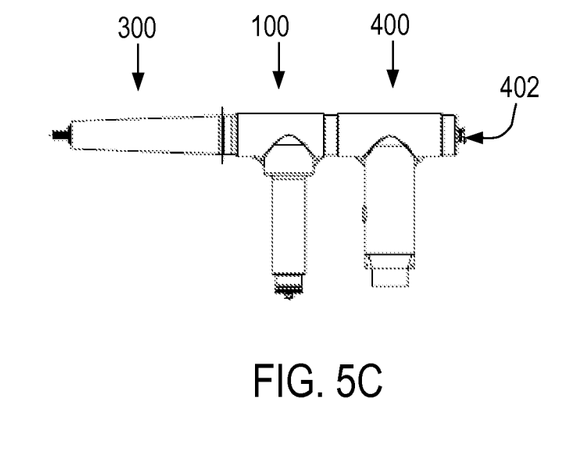

FIG. 5A, FIG. 5B, and FIG. 5C are side views that depict a configuration, wherein the T-body elbow arrester of FIG. 1 is coupled to a bushing 300, cable accessory 400, and insulating plug 402. In FIG. 5A, insulating cap 200—which was coupled in FIG. 4B—has been decoupled from T-body elbow arrester 100. An advantage of the present invention over the prior art is that the connection between elbow arrester 100 and bushing 300 is not loosened as a result of decoupling insulating cap 200. Therefore, elbow arrester 100 remains securely coupled to bushing 300. Next, in FIG. 5B a first end of connector accessory 400 is positioned to be coupled with male feature 114 of elbow arrester 100. An insulating plug 402 is positioned to couple with a second end of connector accessory 400. Insulating plug 402 can include a plug component and coupling component, wherein the end of the insulating plug can be configured to be coupled to a receiving feature. In the present embodiment, the second end of connector accessory 400 is configured to receive insulating plug 402. Further, the first end of connector accessory 400 is configured to receive male feature 114 of T-body elbow arrester 100.

An inherit disadvantage of connector accessory 400 is that male feature 114 is not securely coupled to connector accessory 400, until both male feature 114 and insulating plug 402 are coupled within cable accessory 400. Further, decoupling insulating plug 402 to attach another accessory results in male feature 114 no longer remaining securely coupled to cable accessory 400. Although connector accessory 400 is depicted as a T-body elbow, it would be apparent to one skilled in the art that other connector accessories, including, but not limited to an elbow arrester 100 could be utilized.

Figure 6A:
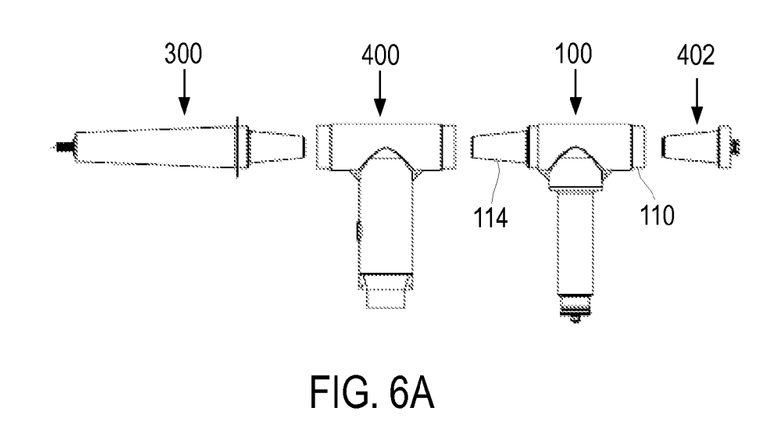
FIG. 6A and FIG. 6B are side views that depict coupling an embodiment of the present inventor to a cable accessory at the male feature and to an insulating plug at the female feature.
Figure 6B:
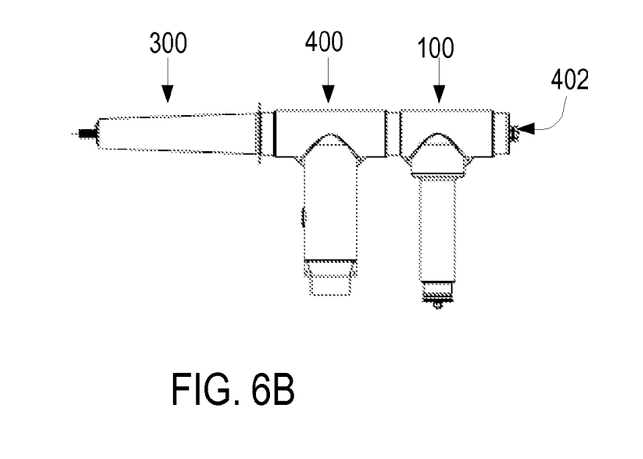

FIG. 6A and FIG. 6B are side views that depict a configuration, wherein the T-body elbow arrester of FIG. 1 is coupled to a cable accessory 400, and insulating plug 402. Cable accessory 400 is coupled to bushing 300 at a first end. This coupling is not secure until male feature 114 of elbow arrester 100 is coupled to a second end of cable accessory 400. This assembly thereby electrically connects elbow arrester 100 to bushing 300. Further, an insulating plug 402 is coupled to receiving portion 110 of elbow arrester 100. An advantage of the present invention over the prior art in this configuration is that the connection between elbow arrester 100 and bushing 300 is not loosened as a result of decoupling insulating cap 402. Therefore, elbow arrester 100 remains securely coupled to bushing 300 and another accessory can be quickly coupled to receiving portion 110.

FIG. 7 is a cross-sectional side view of an embodiment of the present invention for the configuration in FIG. 4 and FIG. 5. As shown, a conductive contact 128 is positioned in intermediate portion 112. Conductive contact 128 is electrically connected to MOV arrester block stack 126. When elbow arrester 100 is coupled to an apparatus on receiving portion 110, the apparatus is electrically connected to MOV arrester block stack 126. In the present embodiment, coupling fastener 130 is integrally molded in intermediate section 112 extending towards male feature 114. A first end 130a is connected to conducting core 132, which extends to end 116 of male feature 114. Conducting core 132 electrically connects the apparatus coupled to male feature 114, to MOV arrester stack 126, through conductive contact 128, when another apparatus is coupled to receiving feature 110. End 116 of male feature 114 can consist of a female threaded section that is configured to threadably receive a male threaded section of an apparatus coupled to male feature 114. Further, a second end 130b of coupling fastener 130 can include a female threaded section that is configured to threadably receive a male threaded section of an apparatus coupled to receiving feature 110.

FIG. 8 is a cross-sectional side view of an embodiment of the present invention for the configuration in FIG. 6. As shown, a conductive contact 128 is positioned in intermediate portion 112. Conductive contact 128 is electrically connected to MOV arrester block stack 126. In the present embodiment, coupling fastener 130 is integrally molded into an end 116 of male feature 114, compared to the configuration in FIG. 7, wherein coupling fastener 130 is integrally molded into intermediate section 112. A first end 130a of coupling fastener 130 is connected to a conducting core 132 that extends to intermediate portion 112. The end of conducting core 132 positioned in intermediate portion 112 includes a female threaded section that is configured to threadably receive a male threaded section of an apparatus coupled to receiving feature 110. When an apparatus is coupled to male feature 114, the apparatus is electrically connected to MOV arrester block stack 126, when a threaded section, such as a male thread, is coupled to a second end 130b of coupling fastener 130. In the present embodiment the second end 130b can include a female threaded section that is configured to threadably receive a male threaded section of an apparatus coupled to receiving feature 110.

Referring now to FIG. 7 and FIG. 8, the outer surface of elbow body 102 can be electrically shielded, and consist of an elastomer such as EPDM rubber or the like. As shown in the present embodiment, elbow body 102 includes an inner portion 102b that can be an insulating EPDM and an outer portion 102a that can be conductive.

Thus, there has been summarized and outlined, generally in broad form, a plurality of the most important features of the present invention. While this summary is presented so that the novelty of the present contribution to the related art may be better appreciated, it will further be apparent that additional features of the invention described hereinafter (which will form the subject matter of the claims appended hereto) will further define the scope, novelty, and in certain instances the improvements upon any existing art. The following description provides specific details for a thorough understanding of, and enabling description for, various examples of the technology. One skilled in the art will understand that the technology may be practiced without many of these details and it is to be readily understood that the invention presented herein is not limited in its application to the details of construction and to the arrangements of the components set forth in the following description or illustrated in the various figures integrated and categorized herein. For example, in some instances, well known structures and functions have not been shown or described in detail to avoid unnecessarily obscuring the description of the examples of the technology. It is intended that the terminology used in the description presented below be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Those skilled in the art will appreciate that the disclosure of the present invention may readily be utilized as a basis for forming other similar structures, methods and systems for carrying out the various purposes and objectives of the present invention. Thus, the claims as set forth shall allow for such equivalent constructions insofar as they do not depart.

We claim:

1. A T-body elbow arrester, comprising:
   an elbow body having a first longitudinally extending portion and a second longitudinally extending portion, wherein the second portion protrudes substantially perpendicular from an intermediate section of the first portion to define a T-body;
   a surge arrester portion located within the second portion of the elbow body;
   a receiving feature located within the first portion of the elbow body extending from the intermediate section towards a first end of the first portion of the elbow body;
   a male feature integrally molded to a second end of the first portion of the elbow body, opposite from the receiving feature; and
   an integral coupling fastener, wherein an apparatus coupled to a first end of the coupling fastener can independently be decoupled without loosening the connection of another apparatus inserted into the receiving feature and connected to a second end of the coupling fastener.

2. The elbow arrester of claim 1, wherein the male feature is a 600 A deadbreak tap and wherein the surge arrester portion comprises a metal oxide varistor (MOV) arrester block stack.

3. The elbow arrester of claim 1, wherein the receiving feature is configured to receive a male bushing.

4. The elbow arrester of claim 1, wherein the integral coupling fastener is a female threaded section.

5. The elbow arrester of claim 1, wherein the integral coupling fastener is positioned within an end of the male feature.

6. An arrester, comprising:
   a T-body comprising an integral mold of
      a male bushing,
      a receiving feature,
      a surge arrester portion, and
      a coupling fastener;
   wherein the male bushing and the receiving feature are positioned substantially parallel along a first portion of the T-body;
   wherein the coupling fastener is molded within the first portion of the T-body;
   wherein a surge arrester is removably secured to the surge arrester portion of the T-body;
   wherein a first apparatus coupled to a first end of the coupling fastener can be decoupled without loosening a second apparatus inserted into the receiving feature and coupled to a second end of the coupling fastener;
   wherein the first apparatus coupled to the first end of the coupling fastener can be decoupled without loosening the surge arrester removably secured to the surge arrester portion;
   wherein the second apparatus coupled to the second end of the coupling fastener can be decoupled without loosening the first apparatus coupled to the first end of the coupling fastener; and
   wherein the second apparatus coupled to the second end of the coupling fastener can be decoupled without loosening the surge arrester removably secured to the surge arrester portion.

7. The elbow arrester of claim 6, wherein the male bushing is a 600 A deadbreak tap and wherein the surge arrester portion comprises a metal oxide varistor (MOV) arrester block stack.

8. The elbow arrester of claim 6, wherein the coupling fastener is positioned within an end of the male feature.

9. The elbow arrester of claim 1, wherein the integral coupling fastener is positioned within the intermediate section.

10. The elbow arrester of claim 6, wherein the coupling fastener is positioned within an intermediate section of the T-body.

* * * * *

UNITED STATES PATENT AND TRADEMARK OFFICE
CERTIFICATE OF CORRECTION

PATENT NO. : 9,728,307 B2
APPLICATION NO. : 13/844033
DATED : August 8, 2017
INVENTOR(S) : Glenn J. Luzzi and Jeffrey L. Madden Page 1 of 1

It is certified that error appears in the above-identified patent and that said Letters Patent is hereby corrected as shown below:

On the Title Page

In the listing of inventors, please replace "Jeffrey J. Madden" with "Jeffrey L. Madden".

In the listing of applicants, please replace "Jeffrey J. Madden" with "Jeffrey L. Madden".

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*